March 8, 1949.  L. C. HUFF  2,463,623
APPARATUS FOR THE CONVERSION OF FLUID REACTANTS
Filed April 12, 1944
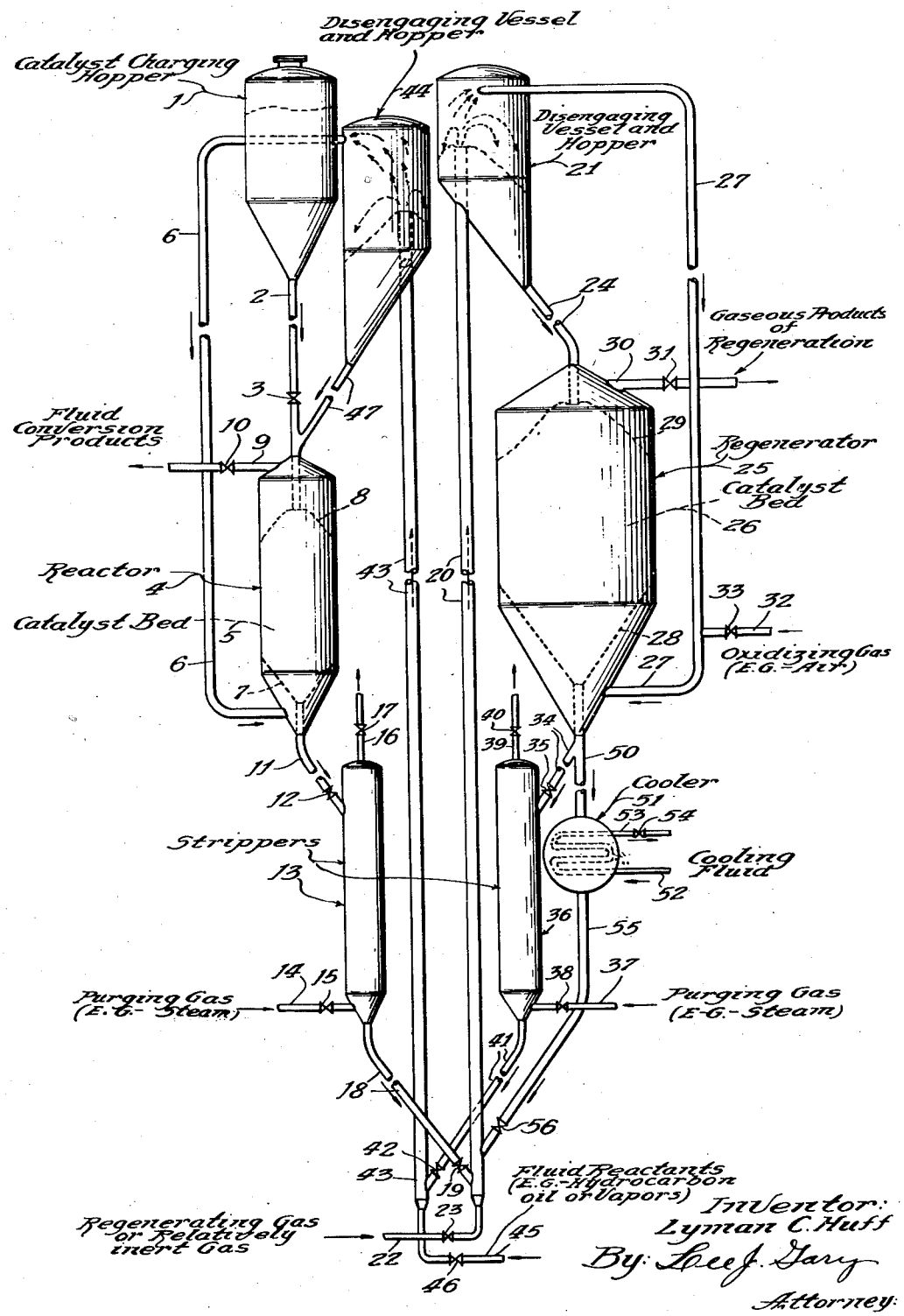
Inventor:
Lyman C. Huff
By Lee J. Gary
Attorney Patented Mar. 8, 1949

2,463,623

UNITED STATES PATENT OFFICE 2,463,623

APPARATUS FOR THE CONVERSION OF FLUID REACTANTS

Lyman C. Huff, Chicago, Ill., assignor to Universal Oil Products Company, Chicago, Ill., a corporation of Delaware Application April 12, 1944, Serial No. 530,645

1 Claim. (Cl. 23—288)

The invention is directed to an improved method and means for effecting the conversion of fluid reactants in the presence of a mass of subdivided solid contact material which becomes contaminated with deleterious products of the conversion reaction and is regenerated by removing the deleterious contaminants. The process is of the type in which the conversion step and the regenerating step are conducted continuously and simultaneously in separate confined reaction and regenerating zones between and through which the subdivided solid contact material is continuously circulated.

The process and apparatus are particularly advantageous as applied to hydrocarbon conversion reactions, such as catalytic cracking, reforming, dehydrogenation, dehydrocyclization or aromatization and the like, in which the contact material comprises catalyst which promotes the desired hydrocarbon conversion reaction. The invention is further more particularly directed to an improved operation of the type in which the mass of subdivided solid catalyst or contact material in the reaction and regenerating zones is maintained in the form of a relatively compact bed of downwardly moving solid particles.

Preferably, the catalyst or contact material employed is in the form of small substantially spherical particles. Their size, whether spherical or of other regular or irregular shape, is sufficient that the particles will not compact excessively to give a high pressure drop when beds of substantial depth are employed in the reaction and regenerating zones. It is a further requirement that the solid particles be sufficiently small to facilitate their transportation by gas-lift in a part of the circuit through which they flow between the reaction and regenerating vessels.

The ability of the solid particles to be transported by gas-lift can be calculated by known formulae, taking into account their average density and the density and velocity of the transporting fluid. To be readily transported by gas-lift and to avoid excessive compaction in the beds, I have found that spherical particles of cracking catalyst, for example, consisting predominantly of silica and one or more metal oxides, such as alumina, zirconia, magnesia and the like, are preferably from 2 to 4 mm. average diameter. The presence in the beds of substantial quantities of excessively fine particles of a powdery or dusty nature should be avoided so that they will not excessively fill the voids between the larger particles and give an excessive pressure drop for the reactants and regenerating gases passing through the beds. For this reason, the particles charged to the system are preferably of substantially uniform or well graded size and any excessive quantity of fines produced by attrition of the larger particles within the system is preferably removed from the system and replaced by larger particles. To avoid excessive attrition, the particles should have good structural strength. The use of substantially spherical particles will also greatly assist in avoiding excessive attrition. One suitable method of preparing synthetic catalysts which may be advantageously used in the present process is disclosed in application Serial Number 516,392 of Glenn M. Webb and Reno W. Moehl, filed December 31, 1943, and now abandoned.

A special feature of the invention resides in the manner and means whereby continuous circulation of the subdivided solid catalyst or contact material is effected through the system. Regenerated solid particles pass downwardly by gravity from a suitable hopper mounted above the reaction vessel into the latter and pass downwardly through the bed maintained within the reactor to be discharged from the lower portion thereof and continue their downward flow into a vertically extending conduit or transfer line wherein the solid particles are picked up and dispersed in a stream of transporting fluid, which serves to lift the solid particles to a suitable elevation above the regenerating vessel. The solid particles and transporting gas are substantially separated at this relatively high elevation and this may be accomplished by discharging them into a suitable disengaging zone and hopper mounted above the regenerator. The solid particles pass thence downwardly into the bed thereof maintained in the regenerator and pass downwardly through the bed to be discharged from the lower portion thereof. The particles continue to pass downwardly from the lower portion of the bed in the regenerator into another vertically extending conduit or transfer line wherein they meet and are dispersed in another stream of transporting fluid and are lifted by the latter to a suitable elevation above the bed in the reactor. The last named transporting fluid and solid particles are then substantially separated and this may be accomplished, for example, in the first named hopper which also serves as a disengaging zone for the transporting fluid and solid particles and from which the solid particles are directed downwardly to the bed in the reactor as previously mentioned.

By effecting circulation of the solid particles through the system in the manner above described, the reaction and regenerating vessels may both be disposed at a relatively low elevation and, when desired, at substantially the same elevation, thus avoiding the use of an excessively high supporting structure for either of the vessels. This feature, in combination with the provision for employing relatively compact beds in the reaction and regenerating zones, so that the required size of the reaction and regenerating vessels for a given charging stock capacity is minimized, materially reduces the cost of the installation as compared with operations of the turbulent fluid bed type and operations in which the reaction and regenerating vessels are superimposed.

Another advantageous feature of the preferred embodiment of the process herein provided resides in the use of incoming fluid reactants to be converted and/or incoming regenerating gas as the transporting media employed as above described. Fluid reactants when thus employed serve to transport the solid particles discharged from the regenerator through the aforementioned vertically extending conduit or transfer line to the disengaging zone above the reactor whereby the separated solids thence flow by gravity into the reaction zone. When incoming regenerating gas is employed as a transporting medium for the solid particles it is commingled with the solid particles discharged from the reactor in the above mentioned vertically extending conduit or transfer line through which the solid particles and regenerating gas pass to the disengaging zone disposed above the regenerator whereby the separated solid particles may flow thence by gravity into the regenerating zone. In such an operation the fluid reactants after being employed as a transporting medium are supplied from the disengaging zone above the reactor to the lower portion of the reactor wherein they flow upwardly through the bed of solid particles disposed therein with resulting fluid conversion products which are discharged from the upper portion of the bed and from the reactor. Incoming regenerating gas employed as a transporting medium in the manner above described is directed from the disengaging zone above the regenerator to the lower portion of the regenerator and passes upwardly with resulting gaseous products of the regeneration through the bed in the regenerator to be discharged from the upper portion of the bed and from the regenerating zone. When both fluid reactants and regenerating gas are employed in the manner above described, the use of an extraneous or auxiliary fluid for effecting transportation of the solid particles is obviated with a resulting material saving in operating cost. This method also obviates the necessity for employing mechanical elevators or the like in the catalyst circuit.

It should be understood that, in its broader aspects, the invention is not limited to a combination of the advantageous features above mentioned since each of them will be found advantageous per se. For example, it is considered within the scope of the invention to employ fluid reactants for transportation of the solid particles discharged from the regenerator toward the reactor without necessarily employing regenerating gas for transporting the solid particles discharged from the reactor toward the regenerator and the converse is also within the scope of the invention. In such instances a mechanical conveyer or the like may be employed for lifting the catalyst on that side of the circuit which does not use the incoming reactants or the incoming regenerating gas as transporting fluid or an auxiliary transporting fluid, such as steam, relatively inert gas, hydrocarbon gases or the like, may be employed as transporting fluid in one portion of the circuit, while incoming reactants or regenerating gas is employed in the other portion. It is also within the scope of the invention, in its broader aspects, to mount the reactor above the regenerator or vice versa so that gravity flow may be employed for the solid particles from the upper to the lower vessel. Also, in its broader aspects, the invention is not limited to the use of spherical solid particles nor to the use of compact beds in the reactor and/or regenerator. When desired, the bed of subdivided solid particles in the regenerator may be maintained in a relatively turbulent fluid-like condition, preferably of relatively high density or solid particle concentration, by passing the fluid reactants or the regenerating gas, as the case may be, and the resulting fluid conversion products or gaseous products of regeneration upwardly through the bed at a velocity which partially counteracts the force of gravity on the solid particles and brings about their hindered settling.

It is also within the scope of the invention, when desired, to pass the solid particles and the fluid reactants and resulting fluid conversion products concurrently through the reaction zone in either a general upward or general downward direction. For example, when using incoming fluid reactants as a transporting medium for the solid particles discharged from the regenerator, the commingled stream of incoming reactants and regenerated solid particles may be directed into the upper portion of the reaction vessel in which a relatively compact bed of the solid particles is maintained and through which the solid particles and the reactants and resulting fluid conversion products pass concurrently downward, said conversion products being separated from the solid particles in the lower portion of the reactor and discharged therefrom separate from the stream of solid particles which is thence transported to the regenerator.

Although the features of the invention are advantageously applicable to the conversion or treatment of fluid reactants generally in the presence of a mass of subdivided solid contact material, catalyst or reagent, they are, as previously mentioned, particularly advantageous as applied to the catalytic conversion of fluid hydrocarbons and, for the sake of being more explicit in illustrating the features and advantages of the invention, the succeeding description will be directed principally to an operation in which hydrocarbon oil is catalytically cracked.

The accompanying diagrammatic drawing is an elevational view of one specific form of apparatus embodying the features of the invention and in which the improved process provided by the invention may be successfully conducted.

Referring now to the drawing and to the flow through the system illustrated, the system is charged with fresh catalyst particles from a suitable hopper 1 and may be continuously or intermittently supplied during the operation to replace that lost in the form of fines. The catalyst flows downwardly from hopper 1 by gravity, or, when desired, with the assistance of an inert gas pressure imposed on the catalyst within the hopper, through conduit 2, and valve 3 into the upper portion of the reaction vessel 4. During operation of the process, regenerated catalyst is continuously supplied to the upper portion of reactor 4, as will be later described.

A relatively compact bed 5 of the subdivided solid catalyst particles is maintained within the reaction vessel and the catalyst particles pass downwardly through the bed in countercurrent contact with the ascending hydrocarbon vapors to be converted and vapors and gases resulting from catalytic conversion of the hydrocarbons within the bed.

The reactants are supplied in essentially vaporous state to the lower portion of the reactor through line 6, in the manner which will be later explained, and are directed upwardly through the substantially cone-shaped perforate plate, screen or other suitable form of distributing grid indicated at 7 which defines the lower extremity of bed 5.

Vaporous and gaseous conversion products leave the bed at its upper extremity, which is indicated approximately by the broken line 8, and are directed from the space provided within the reactor above bed 5 through line 9 and valve 10 to suitable separating and recovery equipment which does not constitute a novel part of the system and is therefore not illustrated.

Any catalyst fines entrained in the outgoing fluid conversion products and carried therewith from the reactor may be separated by passing the outgoing stream through suitable equipment, such as a centrifugal or cyclone type separator, electrical precipitator or the like, not illustrated. In the preferred embodiment of the invention using substantially spherical catalyst particles, the quantity of fines formed within the system and entrained in the outgoing conversion products will ordinarily be negligible. However, when desired, even this small amount may be separated from the outgoing vapors and gases by suitable means, such as previously mentioned, but they are preferably not returned to the system.

In passing through bed 5 in reactor 4, the catalyst particles will accumulate deleterious combustible contaminants comprising heavy products of the conversion reaction conducted in this zone. The stream of catalyst leaving the reactor will also carry some occluded and adsorbed hydrocarbons of a more volatile nature than the heavy contaminants and it is advantageous to substantially strip these lighter volatile fractions from the catalyst before it is supplied to the regenerating step where all or a substantial portion of the remaining heavy contaminants are burned to restore the desired degree of activity to the catalyst. For this reason a stripping zone comprising column 13 is provided, in the case illustrated, beneath reactor 4 and is employed as will now be described.

A stream of contaminated catalyst particles carrying adsorbed and occluded volatiles is directed from the lower portion of the bed in the reactor through conduit 11 and valve 12 into the stripping column. Here the catalyst is substantially stripped of volatile fractions by passing it downwardly through the stripping zone countercurrent to a stream of purging gas, such as steam, for example, which is supplied to the lower portion of column 13 through line 14 and valve 15.

The catalyst particles passing through the stripping zone are preferably maintained in the form of a relatively dense bed in order to maintain a gravity head for feeding the stripped catalyst into the succeeding transfer line through which it is transported by gas-lift. However, it is within the scope of the invention to maintain the catalyst bed in the stripping column in a more fluent and less dense condition than that of the relatively compact bed 5 in the reactor. This may be accomplished by keeping the velocity of the purging gas passing upwardly through the bed at a sufficiently high value that it partially counteracts the force of gravity on the catalyst particles and brings about their hindered settling within the bed. This will result in more efficient stripping of the hydrocarbon volatiles from the catalyst so long as the velocity of the purging gas is not sufficient to excessively thin out the bed and cause excessive turbulence therein. I have found that with spherical cracking catalyst of the preferred type previously mentioned, a density of approximately 20 to 30 pounds per cubic foot in the catalyst bed maintained in the stripping vessel will give better stripping than can be obtained in a compact bed in this zone which might have a density, for example, of 35 to 45 pounds per cubic foot. Even lower densities may be employed, when desired, by using a higher purging gas velocity or, when desired, the catalyst may simply be rained down through the stripping column countercurrent to the ascending stream of purging gas but, in such instances, a longer relatively dense column of catalyst particles passing from the lower portion of the stripping column to the succeeding gas-lift transfer line is necessary to build up the required hydrostatic head at the lower end of this column.

Purging gas carrying the stripped-out volatile hydrocarbons is discharged from the upper portion of stripping column 13 through line 16 and valve 17, preferably to suitable separating and recovery equipment, not illustrated. When desired, this stream may be commingled with the stream of outgoing fluid conversion products by supplying it by well known means, not illustrated, to the upper portion of reactor 4 above bed 5 or to line 9 or to the succeeding separating and recovery equipment.

A relatively dense stream or flowing column of substantially stripped catalyst particles is directed from the lower portion of stripping column 13 through conduit 18 and a suitable adjustable orifice or flow control valve indicated at 19 into transfer line 20 which, preferably, as in the case here illustrated, is a substantially vertical conduit having no bends and terminating at its open upper end in the disengaging vessel and hopper 21 which is disposed at a suitable elevation above the regenerator. Regenerating gas comprising air or other more dilute oxidizing gas is employed, in the case illustrated, to transport the catalyst particles supplied to transfer line 20 from stripping column 13 through the transfer line into vessel 21 by their gas-lift action.

The regenerating gas is supplied to transfer line 20 through line 22 and valve 23 at a sufficient rate to maintain a relatively high velocity and low density or low solid particle concentration in the stream passing through line 20 so that the hydrostatic pressure in line 20 at the point where the catalyst enters this line from conduit 18 is lower than the hydrostatic pressure in conduit 18 on the upstream side of valve 19. In other words, conduit 18 and the stripping column comprise one leg of a U-tube of which transfer line 20 is the other leg and aeration of the column of catalyst particles in the leg comprising transfer line 20, by the action of the regenerating gas, creates a lower hydrostatic pressure in this leg than that prevailing in the other leg comprising conduit 18 and stripping column 13. Thus, the stripped contaminated catalyst is transported through line 20 by the gas-lift action of the incoming regenerating gas into vessel 21. In vessel 21 the velocity of the entering stream is reduced sufficiently that substantially all of the catalyst particles separate by gravity from the regenerating gas and are collected in the lower portion of the vessel which serves as a catalyst hopper.

A stream of the contaminated and substantially purged catalyst particles is directed downwardly from the lower portion of vessel 21 through conduit 24 into the upper portion of the regenerating vessel 25, wherein a relatively compact bed 26 of the catalyst undergoing regeneration is maintained. The catalyst particles of bed 26 pass downwardly therethrough countercurrent to the oxidizing gas employed to effect their regeneration and combustion gases formed by burning of the contaminants from the solid particles.

The regenerating gas after being used to transport the catalyst to vessel 21, as previously described, and after being separated from substantially all or a major portion of the catalyst thus transported is directed from the upper portion of vessel 21 through conduit 27 into the lower portion of the regenerator beneath the perforate distributing member 28 which defines the lower extremity of bed 26. The oxygen-containing regenerating gas passes upwardly through member 28 into bed 26 and into countercurrent contact with the solid particles of the bed, burning combustibles therefrom as it passes upwardly through the bed.

The gaseous products of regeneration pass from the upper extremity of bed 26, which is indicated approximately by the broken line 29, into the space provided within the regenerator above bed 26. They are thence directed through line 30 and valve 31, preferably to suitable equipment, such as a waste-heat boiler, steam superheater, hot gas turbine or the like, not illustrated, for the recovery of readily available heat energy from these gases. As previously mentioned, in conjunction with the stream of conversion products discharged from reactor 4 through line 9, it is within the scope of the invention to provide suitable separating equipment, such as an electrical precipitator, a centrifugal or cyclone separator, scrubber or the like, not illustrated, for separating any entrained catalyst fines from the gaseous products of combustion discharged from the regenerator. However, such fines are preferably not returned to the system, particularly when the catalyst charged thereto is in spherical or other granular form and when the catalyst beds in the reactor and regenerator are kept in a relatively compact condition.

Hot regenerated catalyst is withdrawn from the lower portion of the bed 26 in the regenerator and directed through conduit 34 and a suitable valve or fixed orifice 35 disposed within this line into a stripping column 36. In the case illustrated, column 36 is similar to stripping column 13 and functions in a similar manner to substantially strip the catalyst supplied thereto of occluded oxidizing gas and combustion gases before it is returned to the reactor. Suitable purging gas, such as steam, for example, is supplied to the lower portion of column 36 through line 37 and valve 38 and passes upwardly through the stripping zone countercurrent to the descending catalyst particles which preferably pass therethrough in the form of a relatively dense bed. Various alternative modes of operating stripping zone 36 and the factors which influence their choice are the same as those mentioned in conjunction with stripping zone 13. A purging gas and stripped-out gases are discharged from the upper portion of stripper 36 through line 39 and valve 40, preferably to suitable separating and recovery equipment and these gases may, when desired, be commingled with the combustion gases discharged from the regenerator by supplying the same by well known means, not illustrated, to the upper portion of the regenerator above bed 26 or to line 30 or to any subsequent separating or heat recovery equipment not shown.

Substantially stripped hot regenerated catalyst is directed from the lower portion of column 36 through conduit 41 and the adjustable orifice or flow control valve 42, provided in this conduit, into transfer line 43, which, as in the case illustrated, preferably comprises a substantially straight vertical conduit. Transfer line 43 terminates at its open upper end in the disengaging vessel and hopper 44 and regenerated catalyst is transported into this zone through line 43 by the gas-lift action of a transporting fluid supplied through line 45 and valve 46. In the case illustrated, this transporting fluid comprises hydrocarbon reactants to be converted and the latter are preferably supplied to line 43 in essentially vaporous state. However, when desired, normally liquid charging stock may be supplied through line 45 to line 43 in liquid or mixed phase condition in which case it will be substantially and quickly vaporized by contact with the hot catalyst with which it is commingled in line 43. The resulting vapors will serve as the "gas-lift" for the catalyst particles. The general method whereby catalyst is transported from the regenerator to vessel 44 is the same as that previously described, whereby catalyst is transported from reactor 4 to vessel 21, a higher hydrostatic pressure being maintained in conduit 41 on the upstream side of valve 42 than that prevailing in transfer line 43 at the point where the catalyst is supplied thereto.

As in vessel 21, the velocity of the commingled stream of catalyst particles and transporting vapor or gas entering vessel 44 from transfer line 43 is reduced to such an extent that substantially all of the catalyst particles separate by gravity from the transporting vaporous stream and collect in the lower portion of vessel 44 which serves as a catalyst hopper. The regenerated catalyst is returned from the lower portion of the hopper through conduit 47 to the upper portion of bed 5 in the reactor, thus completing the catalyst circuit through the system.

Vaporous and/or gaseous reactants, after serving as transporting fluid in line 43 and after being substantially disengaged from the catalyst particles in vessel 44, are directed from the upper portion thereof through line 6 to the lower portion of reactor 4 beneath member 7 and pass upwardly through the latter, as previously described, into bed 5 wherein their conversion is effected.

To assist in controlling the average temperature prevailing in the regenerator and prevent subjecting the catalyst in this zone to such high temperature that its activity is rapidly impaired or destroyed, I contemplate recycling regenerated catalyst withdrawn from the lower portion of the bed in the regenerator to the upper portion thereof after it has been cooled. This will dilute the contaminated catalyst entering the regenerator with regenerated catalyst particles from which all or a major portion of the combustibles have been burned, in addition to reducing the average temperature of the total mass of solid particles entering the regenerating step.

To accomplish the aforementioned method of controlling temperature in the regenerating step, in the particular case illustrated, a portion of the hot regenerated catalyst withdrawn from the lower portion of bed 26 is diverted from line 34 and supplied through line 50 to cooler 51. This cooler may be any convenient form of heat exchanger capable of reducing the temperature of the catalyst supplied thereto to the desired degree. Suitable cooling fluid, such as water, steam, oil or the like, is supplied to cooler 51 through line 52 and passes through the cooler in indirect contact and heat transfer relation with the catalyst particles. The resulting heated fluid is discharged from cooler 51 through line 53 and valve 54. The resulting cooled catalyst is directed from cooler 51 through line 55 and the adjustable orifice or flow control valve 56 disposed therein into transfer line 20. In this line the cooled regenerated catalyst is commingled with the transporting fluid supplied through line 22 and with the contaminated catalyst from line 18 and is carried upward to vessel 21 to commingle therein with the catalyst collected in the lower portion of this zone and to pass therefrom through line 24, as previously described, back into bed 26 in the regenerator. Regenerated catalyst is thus cooled and recycled at a rate regulated to keep the maximum temperature in the regenerating step within safe limits so that the catalyst is not overheated in the regenerating zone.

As previously indicated, the invention is not limited in its broader aspects to the use of incoming regenerating gas for transporting the contaminated catalyst from the reactor toward the regenerator nor to the use of incoming fluid reactants for transporting the regenerated catalyst from the regenerator toward the reactor. For example, steam, nitrogen, carbon dioxide or other relatively inert gas may be employed as transporting fluid in place of either or both the incoming reactants and the incoming regenerating gas. I also specifically contemplate the use of outgoing fluid conversion products for transporting catalyst discharged from the reactor toward the regenerator and the use of outgoing gaseous products for regeneration for transporting catalyst withdrawn from the regenerator toward the reactor. To avoid complexity these alternative methods of operation are not illustrated in the drawing, but will now be described in more detail.

To use outgoing fluid conversion products as a transporting medium in transfer line 43, a portion or all of the vaporous and/or gaseous conversion products withdrawn from the reactor through line 9 are supplied by well known means, not illustrated, through line 45 and valve 46 to transfer line 43. After their use as transporting fluid in line 43 and after their substantial separation from the catalyst particles in vessel 44, the vapors and/or gases discharged from this zone through line 6 are directed to the subsequent fractionating and recovery equipment rather than back to the reactor. Also, the incoming reactants are supplied directly to the lower portion of the reactor beneath member 7 instead of first passing through line 43 and the disengaging vessel 44.

To use outgoing gaseous products of regeneration as transporting fluid in transfer line 20, all or a portion of the gases discharged from the regenerator through line 30 are directed by well known means, not illustrated, to line 22 and through valve 33 into transfer line 20. After serving as transporting fluid for the contaminated catalyst in this line or for a mixture of the contaminated catalyst from the reactor and cooled regenerated catalyst from cooler 51, and after being substantially separated from the catalyst particles in vessel 21, the gas is discharged from the upper portion of vessel 21, preferably to the heat recovery equipment previously mentioned, instead of being returned through line 27 to the regenerator. When thus employing outgoing regenerated gas as transporting fluid, the incoming oxidizing gas stream employed for effecting regeneration is supplied directly to the lower portion of the regenerator beneath member 28 through line 32, valve 33 and line 27. Alternatively, when desired, a portion of the oxidizing gas may be supplied through line 22 and valve 23 to transfer conduit 20 to serve therein as transporting fluid after which it is directed from vessel 21 through line 27 into the regenerator while additional oxidizing gas is supplied to the regenerator through line 32, valve 33 and line 27.

In starting the operation, hot combustion gases from an external source may be supplied through line 22 and valve 23 to transfer line 20 and after serving as transporting fluid in this line are directed from vessel 21 through line 27 into the regenerator to supply heat to the solid particles passing therethrough and warm up the system. Then, as the conversion reaction gets under way in reactor 4 and combustibles accumulate on the catalyst being supplied therefrom to the regenerator, air or other oxidizing gas may be gradually admitted through line 22 and valve 23 and/or through line 32 and valve 33 to bring about combustion of the contaminants in the regenerator.

A feature of the apparatus provided which is considered particularly advantageous resides in the provision of relatively straight and substantially vertical transfer conduits, indicated at 20 and 43 in the drawing, wherein the solid particles are transported by gas-lift. Due to the relatively high velocity preferably employed in gas-lift transfer conduits in order to avoid going to an excessively large diameter in these conduits, a serious erosion problem has heretofore been encountered therein, due particularly to the presence of the errosive solid particles in the transporting gas stream. I have found that this erosion problem can be largely obviated or minimized by avoiding bends in the transfer conduits and by making them substantially vertical. It will be apparent from the drawing how this is accomplished in the case illustrated. In other conduits wherein the stream of solid particles passing therethrough is relatively dense or compact, the velocities are considerably lower for the same weight of solid particles transferred as compared with the velocities encountered in the gas-lift transfer line. For this reason, no serious erosion difficulties are encountered in the conduits handling the denser streams and it is advantageous, as has been done in the case illustrated, to put any required bends in these conduits rather than in the gas-lift transfer line.

I claim:

An apparatus for the conversion of hydrocarbons comprising a catalytic reactor and a first separating chamber disposed thereabove, a catalyst regenerator and a second separating chamber disposed thereabove, a conduit connecting the lower portion of said first chamber with the upper portion of the reactor, a conduit connecting the lower portion of said second chamber with the upper portion of the regenerator, a first substantially straight transfer conduit disposed externally of the reactor and regenerator and extending upwardly from an elevation beneath the reactor into said second chamber, a second substantially straight transfer conduit disposed externally of the reactor and regenerator and extending upwardly from an elevation beneath the regenerator into said first chamber, means for supplying catalyst particles from the lower portion of the reactor to said first transfer conduit, means for supplying catalyst particles from the lower portion of the regenerator to said second transfer conduit, means for introducing regenerating gas to said first transfer conduit, means for introducing hydrocarbon fluid to said second transfer conduit, a conduit connecting the upper portion of said first separating chamber with the lower portion of the reactor, and a conduit connecting the upper portion of said second separating chamber with the lower portion of the regenerator.

LYMAN C. HUFF.

REFERENCES CITED

The following references are of record in the file of this patent:

UNITED STATES PATENTS

| Number | Name | Date |
|---|---|---|
| 2,259,487 | Payne | Oct. 21, 1941 |
| 2,302,209 | Goddin | Nov. 17, 1942 |
| 2,303,717 | Averson | Dec. 1, 1942 |
| 2,311,564 | Munday | Feb. 16, 1943 |
| 2,327,175 | Conn | Aug. 17, 1943 |
| 2,331,433 | Simpson et al. | Oct. 12, 1943 |
| 2,337,684 | Scheineman | Dec. 28, 1943 |
| 2,360,787 | Murphree et al. | Oct. 17, 1944 |

FOREIGN PATENTS

| Number | Country | Date |
|---|---|---|
| 539,383 | Great Britain | Sept. 8, 1941 |